United States Patent
Dubrovsky et al.

(10) Patent No.: US 10,419,461 B2
(45) Date of Patent: Sep. 17, 2019

(54) METHOD AND AN APPARATUS TO PERFORM MULTI-CONNECTION TRAFFIC ANALYSIS AND MANAGEMENT

(71) Applicant: SonicWALL US Holdings Inc., Santa Clara, CA (US)

(72) Inventors: Aleksandr Dubrovsky, San Mateo, CA (US); Boris Yanovsky, Saratoga, CA (US); Shunhui Zhu, Mountain View, CA (US)

(73) Assignee: SONICWALL INC., Milpitas, CA (US)

(*) Notice: Subject to any disclaimer, the term of this patent is extended or adjusted under 35 U.S.C. 154(b) by 22 days.

(21) Appl. No.: 15/830,264

(22) Filed: Dec. 4, 2017

(65) Prior Publication Data

US 2018/0091534 A1    Mar. 29, 2018

Related U.S. Application Data

(63) Continuation of application No. 14/834,319, filed on Aug. 24, 2015, now Pat. No. 9,838,404, which is a continuation of application No. 13/316,134, filed on Dec. 9, 2011, now Pat. No. 9,119,109.

(60) Provisional application No. 61/428,772, filed on Dec. 30, 2010.

(51) Int. Cl.
| | |
|---|---|
| *H04L 12/891* | (2013.01) |
| *H04L 29/06* | (2006.01) |
| *H04W 28/16* | (2009.01) |
| *H04L 12/26* | (2006.01) |
| *H04L 12/851* | (2013.01) |

(Continued)

(52) U.S. Cl.
CPC ........ *H04L 63/1416* (2013.01); *H04L 43/062* (2013.01); *H04L 47/20* (2013.01); *H04L 47/2433* (2013.01); *H04L 47/2483* (2013.01); *H04L 47/34* (2013.01); *H04L 47/41* (2013.01); *H04L 63/145* (2013.01); *H04W 28/16* (2013.01)

(58) Field of Classification Search
CPC ... H04L 63/1416; H04L 43/062; H04L 47/20; H04L 47/2433; H04L 47/2483; H04L 47/34; H04L 47/41; H04L 63/145; H04W 28/16
USPC ........................................... 709/223
See application file for complete search history.

(56) References Cited

U.S. PATENT DOCUMENTS

| | | | |
|---|---|---|---|
| 8,102,783 B1* | 1/2012 | Narayanaswamy | .... H04L 43/18 370/252 |
| 9,119,109 B1 | 8/2015 | Dubrovsky | |
| 9,838,404 B2 | 12/2017 | Dubrovsky | |

(Continued)

OTHER PUBLICATIONS

U.S. Appl. No. 13/316,134; Office Action dated Aug. 27, 2014.
U.S. Appl. No. 14/834,319; Office Action dated Mar. 23, 2017.

*Primary Examiner* — Glenford J Madamba
(74) *Attorney, Agent, or Firm* — Polsinelli LLP

(57) ABSTRACT

A method and an apparatus to perform multi-connection traffic analysis and management are described. In one embodiment, the method includes analyzing data packets in the first data flow of a client application for a pattern of interest, where the client application communicates data using first and second data flows. In response to the method detecting a pattern of interest in the first data flow, the method identifies the second data flow and identifies a traffic policy for the second data flow. The method applies the identified traffic policy to the second data flow. Other embodiments have been claimed and described.

20 Claims, 15 Drawing Sheets

(51) Int. Cl.
*H04L 12/813* (2013.01)
*H04L 12/801* (2013.01)

(56) References Cited

U.S. PATENT DOCUMENTS

| | | | |
|---|---|---|---|
| 2003/0154399 A1* | 8/2003 | Zuk | H04L 63/0254 726/11 |
| 2005/0265331 A1* | 12/2005 | Stolfo | G06F 21/552 370/389 |
| 2010/0174770 A1* | 7/2010 | Pandya | H04L 63/20 709/200 |
| 2015/0365429 A1 | 12/2015 | Dubrovsky | |

\* cited by examiner

METHOD AND AN APPARATUS TO PERFORM MULTI-CONNECTION TRAFFIC ANALYSIS AND MANAGEMENT

CROSS-REFERENCE TO RELATED APPLICATION

This application is a continuation of and claims the benefit of U.S. patent application Ser. No. 14/834,319 filed Aug. 24, 2015, now issued as U.S. Pat. No. 9,838,404, which is a continuation and claims the priority benefit of U.S. patent application Ser. No. 13/316,134 filed Dec. 9, 2011, now issued as U.S. Pat. No. 9,119,109, which claims the benefit of U.S. provisional patent application No. 61/428,772 filed Dec. 30, 2010, the disclosures of which are incorporated herein by reference.

BACKGROUND OF THE INVENTION

1. Field of the Invention

The present invention relates to network traffic management in a networked system, and more particularly, to performing multiple connection traffic analysis and management.

2. Description of the Related Art

Networking products can use pattern matching is used to identify types of data flows, where each data flow is a group of packets with similar characteristics. Once a data flow is identified, the networking product can apply a traffic policy to that identified data flow. A traffic policy determines how the data flow is to be communicated by the networking product. For example, the packets in the data flow could be dropped, have the bandwidth for that data flow restricted, have the bandwidth guaranteed, and/or apply some other know Quality of Service (QoS) policy.

To further complicate the problem, data flow can exhibit more than one pattern, and thus, multiple pattern matching has to be performed in order to successfully screen out these attacks. Such a collection of patterns is called a signature. For example, a data flow signature may contain a recognizable header and a particular phrase in the body. To detect such a data flow, the detection mechanism has to match all the patterns in the signature. If only part of the signature is matched, false positives may occur. As such, the term "pattern of interest" is used to refer to a single pattern or a signature.

When such data flows are transported over multiple packets, the contents, and therefore the recognizable patterns, may exist in payloads of different packets. In addition, a single pattern may be split over several packet payloads. Therefore, two problems have to be solved at the same time. On one hand, the traffic policy mechanism has to scan each pattern across multiple packet payloads, and on the other hand, the detection mechanism also has to scan across patterns. One existing approach is to reassemble all packets and scan for each pattern in sequence. This approach is inefficient in terms of processing time and memory usage because scanning cannot start until all packets are received and reassembled and extra memory is needed to store the packets received.

Another problem in pattern matching is that the packets may arrive out of order. Using Transport Control Protocol (TCP) packets as an example, the application data for these packets is broken into what TCP considers the best sized chunks to send, called a TCP segment. When TCP sends a segment, it maintains a timer and waits for the other end to acknowledge the receipt of the segment. The acknowledgement is commonly called an ACK. If an ACK is not received for a particular segment within a predetermined period of time, the segment is retransmitted. Since the Internet Protocol (IP) layer transmits the TCP segments as IP datagrams and the IP datagrams can arrive out of order, the TCP segments can arrive out of order as well. Currently, one receiver of the TCP segments reassembles the data if necessary, and therefore, the application layer receives data in the correct order.

An existing Traffic Policy System (TPS) that identifies data flows and enforces traffic policies on those data flows typically resides between the two ends of packet communication, inspecting the packets as the packets arrive at the TPS and apply traffic policies to those packets. The TPS looks for predetermined patterns in the payloads of the packets. These patterns are typically application layer patterns. For example, the pattern might be to look for the word "windows". In this example and using TCP communication in the example, the word may be broken into two TCP segments, e.g., "win" in one segment and "dows" in another segment. If these two segments arrive in the correct order, then TPS can detect the word. However, if the segments arrive out of order, then the TPS may first receive the segment containing "dows", and have to hold this segment and wait for the other segment. A typical approach is for the TPS to force the sender to re-transmit all the segments from the last missing one, hoping that the segments may arrive in order the second time. One disadvantage of this approach is the additional traffic in between and the additional processing on both ends of the TCP communication.

An additional challenge is that a client application may communicate in multiple data flows, such as using a control data flow to control the communication of data and a "data" data flow to communicate that data for the client application. A TPS will identify each data flow separately based on the data packets of that data flow and separately apply a traffic policy for that data flow.

SUMMARY OF THE CLAIMED INVENTION

A method and an apparatus to perform multi-connection traffic analysis and management are described. In one embodiment, the method includes analyzing data packets in the first data flow of a client application for a pattern of interest, where the client application communicates data using first and second data flows. In response to the method detecting a pattern of interest in the first data flow, the method identifies the second data flow and identifies a traffic policy for that second data flow. The method applies the identified traffic policy to the second data flow.

Other features of the present invention will be apparent from the accompanying drawings and from the detailed description that follows.

BRIEF DESCRIPTION OF THE FIGURES

The present invention is illustrated by way of example and not limitation in the figures of the accompanying drawings, in which like references indicate similar elements and in which.

DETAILED DESCRIPTION

A method and an apparatus to perform multi-connection traffic analysis and management are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A method and an apparatus to perform multi-connection traffic analysis and management are described. In one embodiment, a traffic policy system communicates multiple data flows for client applications and applies traffic management to these data flows using a dynamically identified traffic policy. The traffic policy system identifies one of the data flow for the client application and identifies a traffic policy for one or more of the other data flows for that client application. The traffic policy system applies this identified traffic policy to the one or more of the other data flows.

Figure 1A:
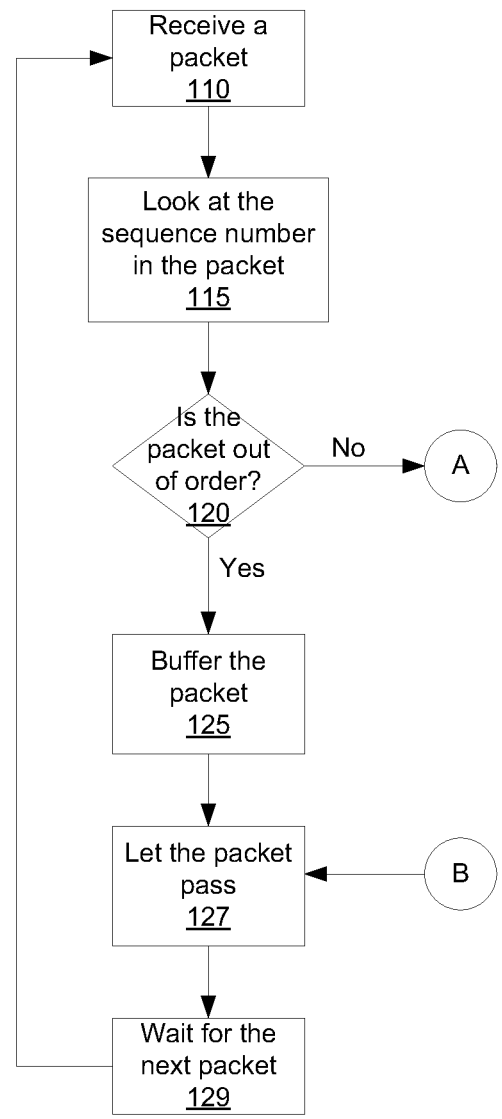
FIGS. 1A and 1B illustrate flow diagrams of one embodiment of a process to perform multiple packet payloads analysis.
Figure 1B:
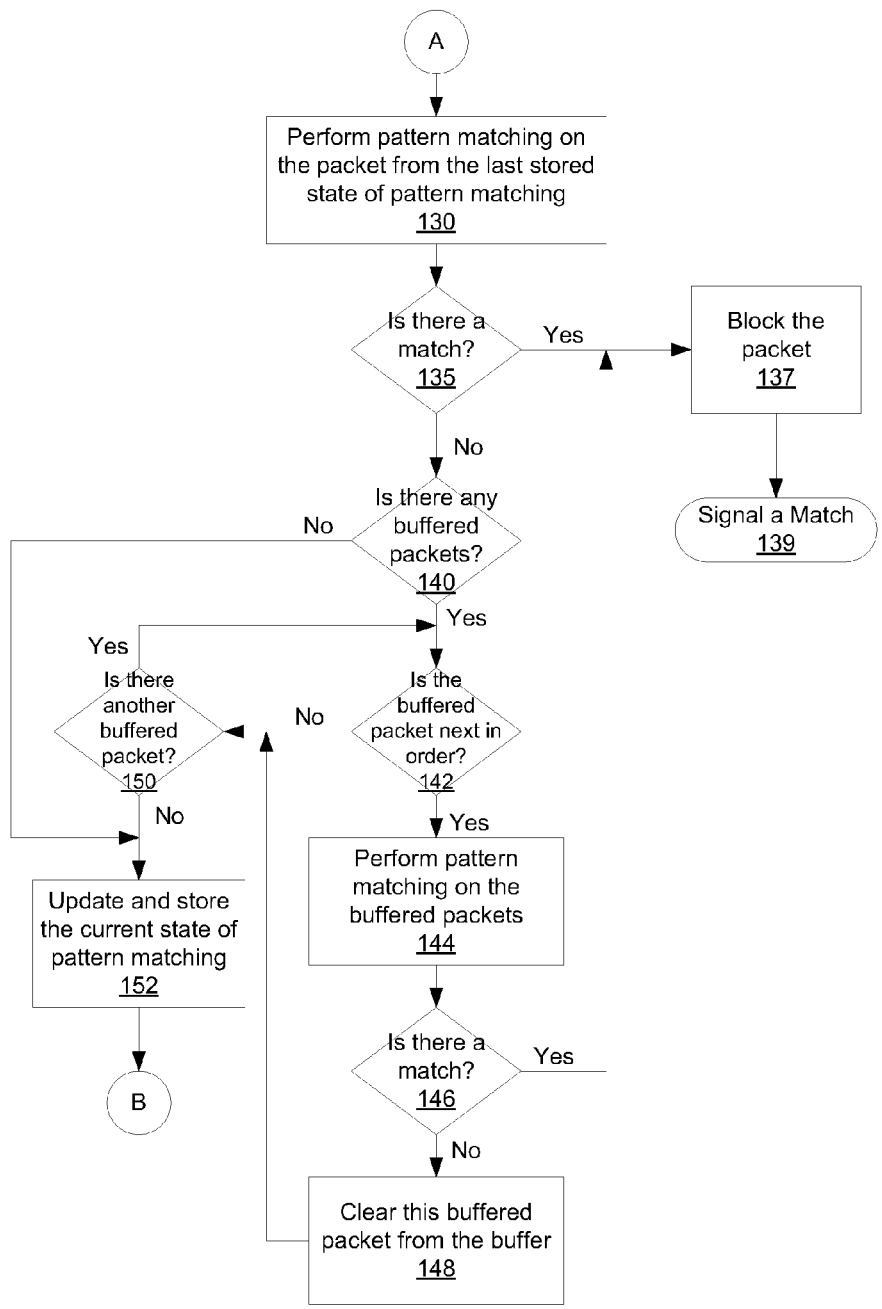

As described above, a traffic policy system can identify a pattern of interest in a data flow. In one embodiment, the pattern of interest can be a data pattern that identifies a particular client application. For example and in one embodiment, the traffic policy system could identify applications such as file transfer protocol clients (FTP), hypertext transfer protocols clients (HTTP), Session Initiation Protocol (SIP), H.323, web browsers, peer-to-peer clients, media applications, etc. by identifying a pattern of interest in payloads of the packets in the data flow. Alternatively, the pattern of interest could be an attack pattern that identifies a virus or other type of attack upon a network. FIGS. 1A and 1B shows flow diagrams of one embodiment of a process to perform multiple packet payload analysis in a Traffic Policy System (TPS). In the following discussion, "data packet" and "packet" are used interchangeably. Examples of a packet include a TCP packet. Other types of packets known on the art can be analyzed as well (user datagram protocol (UDP), Internet Protocol (IP), etc.). Furthermore, each of these types of packet can be used to transport packet of differing protocol (HTTP, secure HTTP (HTTPS), FTP, Real-Time Transport Protocol (RTP), etc.). The process is performed by processing logic that may comprise hardware (e.g., circuitry, dedicated logic, etc.), software (such as is run on a general-purpose computer system, a server, a router, or a dedicated machine), or a combination of both.

Referring to FIG. 1A, processing logic receives a packet (processing block 110). Then processing logic checks the sequence number in the packet (processing block 115) and determines whether the packet is out of order (processing block 120). If the packet is out of order, processing logic buffers the packet (processing block 125) and allows the packet to pass. In some embodiments, processing logic makes a copy of the out-of-order packet and temporarily stores the copy in a storage device, such as a cache. Then processing logic waits for the next packet to arrive (processing block 129).

Referring to FIG. 1B, if the packet is not out of order, processing logic performs pattern matching on the packet from the last stored state of the pattern matching (processing block 130). In some embodiments, processing logic performs pattern matching using one Deterministic Finite Automaton (DFA) for each predetermined pattern. Detail on pattern matching using a DFA is described below with reference to FIG. 2A. Furthermore, processing logic may have been set up to perform multiple pattern matching in order to scan for a signature. To perform multiple pattern matching, processing logic may use a logical pointer to point at the pattern that is currently being matched.

Referring back to FIG. 1B, processing logic then determines whether the in order packets received so far match a predetermined pattern of interest (i.e., a pattern or a signature) (processing block 135). If there is a match, processing logic identifies the data flow corresponding to the packet as having a pattern of interest (processing block 137) and signals that match (processing block 139). If there is no match, processing logic checks whether there is any buffered packets in the TPS (processing block 140). If there is no buffered packets in the TPS, then processing logic updates and stores the current state of the pattern matching performed so far (processing block 152). Then processing logic transitions to processing block 127.

If there is at least one buffered packet in the TPS, processing logic checks whether the buffered packet is next in order (processing block 142). Processing logic may check the sequence number in the buffered packet to determine whether the buffered packet is next in order. If the buffered packet is not next in order, then processing logic checks whether there is another buffered packet in the TPS (processing block 150). If there is not another buffered packet in the TPS, then processing logic transitions to processing block 152. Otherwise, processing logic returns to processing block 142 to check whether the other buffered packet is next in order.

If the buffered packet is next in order, processing logic transitions from processing block 142 to processing block 144 to perform pattern matching on the buffered packet. Then processing logic determines whether the packets compared so far contain a pattern matching the predetermined pattern of interest (processing block 146). If there is a match, processing logic transitions to processing block 137 to block the packet. Processing logic then signals a match for the pattern of interest (processing block 139).

If there is no match, then processing logic clears this buffered packet from the buffer (processing block 148). Then processing logic transitions to processing block 150 to check whether there is any more buffered packet. If there is at least one more buffered packet, then processing logic repeats processing blocks 142. Otherwise, processing logic updates and stores the current state of the pattern matching (processing block 152) and then allows the current packet to pass (processing block 127). Processing logic waits for the next packet (processing block 129) before repeating the above process for the next packet.

By copying the out-of-order packets and allowing these out-of-order packets to pass, processing logic does not intrude or interrupt the data traffic, and hence, provides data flow management and may reduce the overall latency in data traffic due to the TPS.

In one embodiment, the process as described in FIGS. 1A and 1B can analyze data packets that are encrypted or compressed. For example and in one embodiment, this process can analyze compressed or encoded packets as described in detail in U.S. patent application Ser. No. 11/112,252 entitled "METHOD AND AN APPARATUS FOR IDENTIFYING DATA PATTERNS IN A FILE", filed on Apr. 21, 2005, and incorporated by reference. Alternatively, this process can analyze encrypted packets. For example and in one embodiment, process 500 can analyze proxy-less Secure Sockets Layer (SSL) packets as described in detail in U.S. patent application Ser. No. 12/497,328, entitled "PROXY-LESS SECURE SOCKETS LAYER (SSL) DATA INSPECTION", filed on Jul. 2, 2009, and incorporated by reference.

Figure 2A:
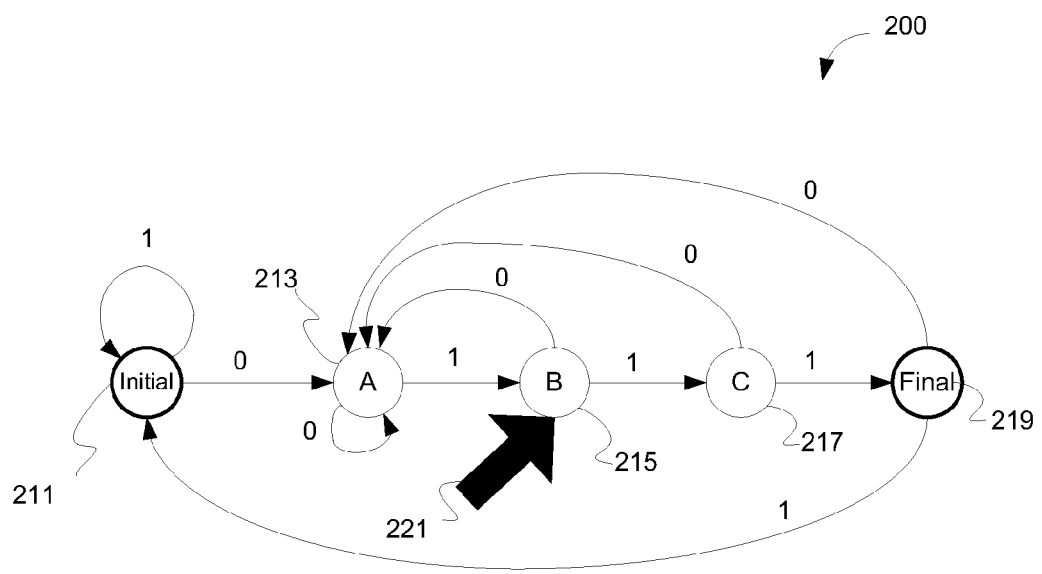
FIG. 2A illustrates an exemplary Deterministic Finite Automaton (DFA) according to one embodiment of the invention.

FIG. 2A illustrates an example of a DFA according to one embodiment of the invention. In this example, a TPS is programmed to identify a pattern of "0111" in a data flow of packets. The DFA 200 shown in FIG. 2A corresponds to this pattern. Processing logic may use the DFA 200 to perform pattern matching on a number of packets to determine whether the packets contain the pattern "0 111". Furthermore, to simplify the illustration, it is assumed in this example that each packet contains only one digit. However, it should be appreciated that the concept is applicable to scenarios where a packet contains more than one digits and/or alphabetic letters.

Referring to FIG. 2A, the DFA 200 includes five states 211-219. The states 211-219 in the DFA 200 may be referred to as nodes. Pattern matching begins at the initial state 211. If a packet received contains a "1", processing logic remains in the initial state 211. If the packet contains a "0", which corresponds to the first digit in the predetermined pattern, processing logic transitions to the A state 213.

If processing logic receives a "0" subsequently, processing logic remains in the A state 213. If processing logic receives a "1", which corresponds to the second digit in the predetermined pattern, then processing logic transitions into the B state 215.

From the B state 215, processing logic may transition back to the A state 213 if the next packet received contains a "0". If the next packet received contains a "1", which corresponds to the third digit in the predetermined pattern, then processing logic transitions to the C state 217.

From the C state 217, processing logic may transition back to the A state 213 if the next packet received contains a "0". If the next packet received contains a "1", which corresponds to the last digit in the predetermined pattern, then processing logic transitions to the final state 219. When processing logic reaches the final state 219, processing logic knows that the packets received so far contains the predetermined pattern. Hence, processing logic may perform the appropriate operations in response to receiving the predetermined pattern, such as applying a traffic policy to the packets in the data flow being analyzed and/or apply the same (or different) traffic policy to other data flows. Identifying and applying traffic policies is further described in FIG. 5 below. To keep track of which state of the DFA processing logic is in, processing logic may use a logical pointer to point to the current state of the DFA. For example, a logical pointer 221 in FIG. 2A points at state B 215 to indicate that state B 215 is the current state of the pattern matching.

One advantage of using the DFA to perform pattern matching on packets is to eliminate the need to reassemble the packets because processing logic can walk through the DFA as each packet is received and examined. If processing logic reaches a final state, there is a match between the pattern contained in the packets received so far and the predetermined pattern. As mentioned above, a pattern is typically broken up into a number of segments and each segment is transmitted using a packet. Using the DFA, processing logic may not have to reassemble the packets in order to find out what the pattern contained in the packets is in order to match the pattern against a predetermined pattern. Processing logic may perform pattern matching on a packet-by-packet basis as each of the packets is received without reassembling the packets. Therefore, processing logic does not have to store the packets for reassembling the packets. Instead, processing logic may simply store a pointer to keep track of the current state in the DFA.

The concept described above may be expanded to signature detection. A signature is a collection of multiple patterns. To keep track of which pattern within a signature is being matched, processing logic may use a tree structure, where each node within the tree structure corresponds to a pattern and each pattern is represented using a DFA. Alternatively, a single DFA may represent multiple patterns, an example of which is discussed below with reference to FIG. 2B. Processing logic may use a pointer to point at the node corresponding to the pattern that is currently being matched.

In some embodiments, multiple patterns in a signature are matched sequentially. That is, once a first pattern is matched, processing logic goes on to try to match a second pattern. However, processing logic may continue looking for the first pattern in the incoming data packets because the first pattern may repeat before the second pattern arrives. In some embodiments, processing logic has to take into consideration of additional rules besides matching individual patterns of a signature. For example, a first pattern may have to be at least x bytes away from the second pattern, where x is a predetermined number. Alternatively, two patterns of the signature may have to be separated from each other by y bytes or less, where y is a predetermined number. In one embodiment, one of the multiple patterns can be located in a header of packet and another pattern is located in the payload of the packet. For example and in one embodiment, a pattern in the header could be one of port, address, protocol, etc., and/or other packet header characteristic known in the art.

Figure 2B:
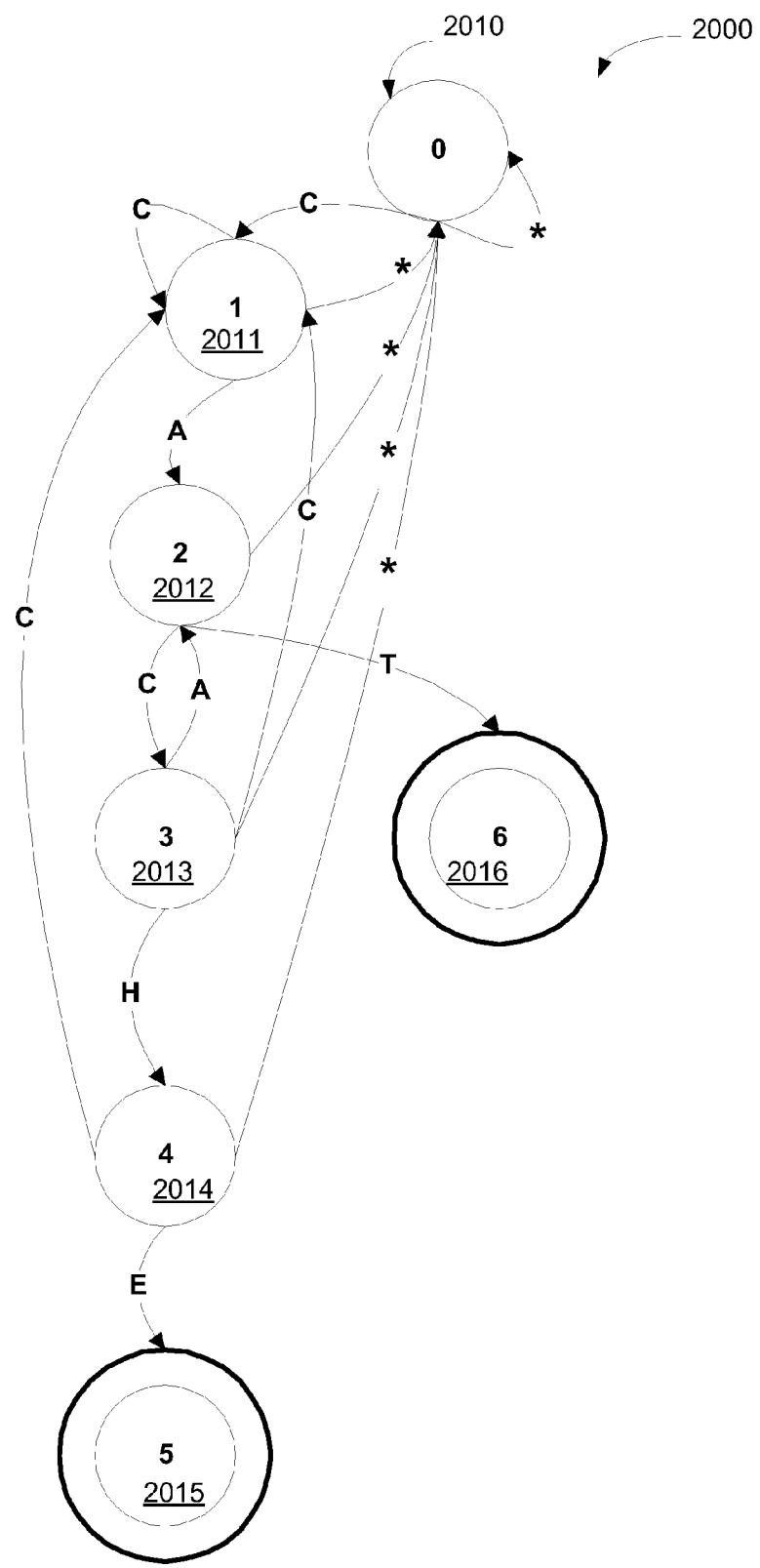
FIG. 2B illustrates an exemplary DFA representing two patterns according to one embodiment of the invention.

FIG. 2B illustrates an exemplary DFA 2000 representing two patterns according to one embodiment of the invention. In this example, a TPS is programmed to detect a pattern of "CAT" and a pattern of "CACHE." Both patterns may be part of a signature. To simplify the illustration, it is assumed in this example that each packet contains only one alphabetic letter. However, it should be appreciated that the concept is applicable to scenarios where a packet contains one or more alphabetic letters, one or more numeric digits and/or other symbols.

The DFA 2000 includes six states 2010-2016. Pattern matching begins at the initial state 2010. If a packet received contains a "C," which is the first letter of both "CAT" and "CACHE," processing logic transitions to the state 2011. If the packet received contains any other alphabet, processing logic remains in the initial state 2010. From state 2011, if processing logic receives a "C," then processing logic remains in state 2011. If processing logic receives an "A," then processing logic transitions to state 2012. If processing logic receives any alphabet other than "A" or "C," processing logic returns to the initial state 2010.

From state 2012, if processing logic receives a "C," then processing logic transitions to state 2013 because "C" is the third letter in the pattern "CACHE." If processing logic receives a "T," then processing logic transitions to the final state 2016 because the pattern "CAT" is matched. If processing logic receives any alphabet other than "T" or "C," processing logic returns to the initial state 2010.

From state 2013, if processing logic receives a "C," then processing logic transitions back to state 2011. If processing logic receives an "H," then processing logic transitions to state 2014. If processing logic receives any alphabet other than "H" or "C," processing logic returns to the initial state 2010.

From state 2014, if processing logic receives a "C," then processing logic transitions back to state 2011. If processing logic receives an "E," then processing logic transitions to the final state 2015 because the pattern matches "CACHE." If processing logic receives any alphabet other than "E" or "C," processing logic returns to the initial state 2010.

As discussed above, when processing logic reaches a final state (e.g., state 2015 and state 2016), processing logic knows that the packets received so far contains at least one of the predetermined patterns. Hence, processing logic may perform the appropriate operations to the data flow being analyzed and related data flow(s) in response to receiving the predetermined pattern, such as blocking the packet of the predetermined pattern last received and issuing an alarm to alert system administrators, blocking packets of other data flows, applying QoS to the data flow being analyzed and/or other data flows, etc.

Furthermore, to keep track of which state of the DF A 2000 processing logic is in, processing logic may use a logical pointer to point to the current state of the DFA 2000. An example of the logical pointer has been discussed above with reference to FIG. 2A.

Figure 2C:
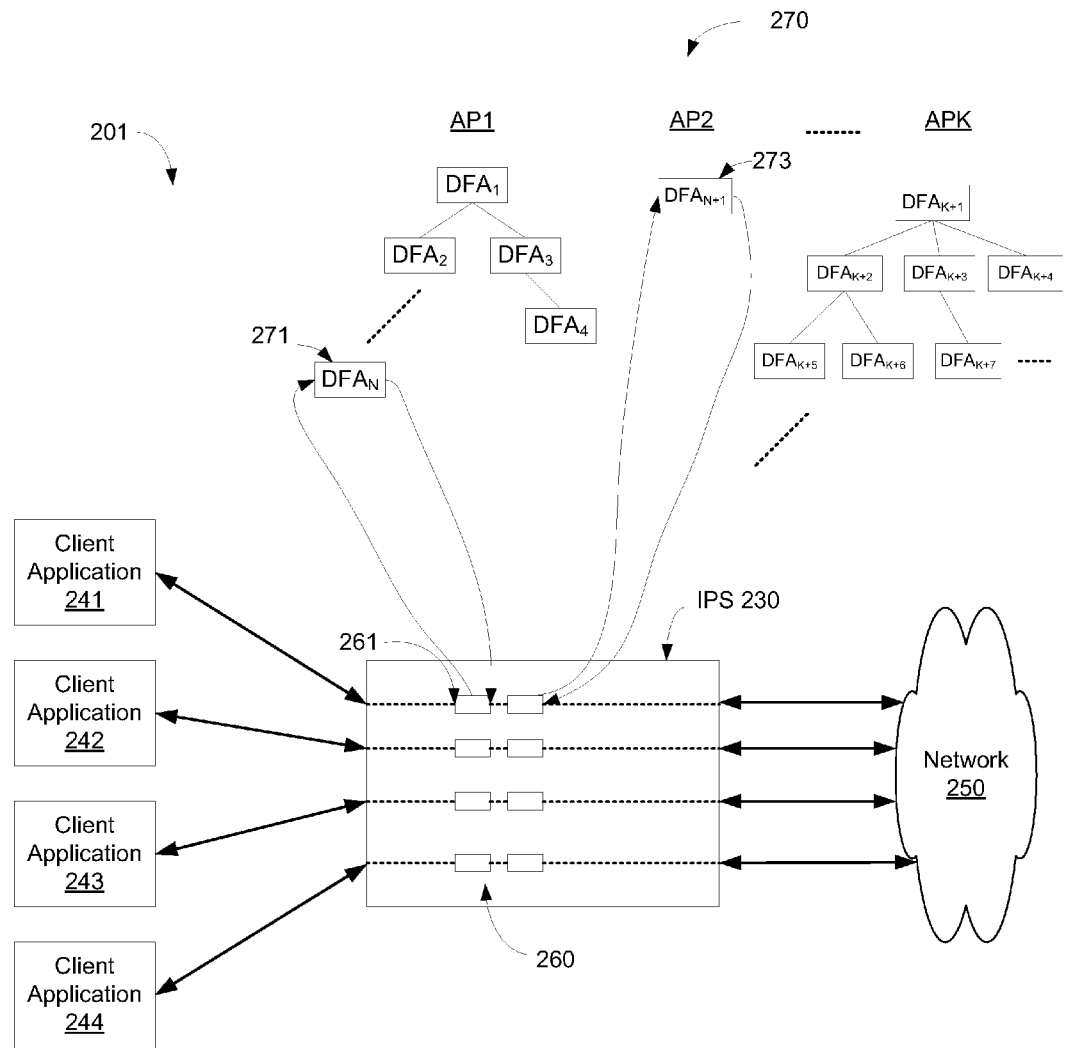
FIG. 2C illustrates one embodiment of a system usable with the invention.

FIG. 2C illustrates one embodiment of a system usable with the invention in which the TPS 230 analyzes client applications with one data flow. The system 201 includes a network 250, a TPS 230, and a number of client applications 241-244. The client applications 241-244 may run on different client machines (e.g., a personal computer, a workstation, server, other computing device etc.) or two or more of the client applications 241-244 may run on a single client machine. Furthermore, the TPS 230 may run on one of the client machines or on a separate unit, such as a server, a router, or a switch.

In some embodiments, data packets 260 (e.g., TCP packets) are transmitted via the TPS 230 between the network 250 and the client applications 241-244. In order to detect multiple signatures in the packets passing through the TPS 230, the TPS 230 keeps track of which signature(s) is being matched for which data flow and which pattern within the corresponding signature is being matched. Referring to FIG. 2C, the TPS 230 is programmed to detect a number of patterns of interest 270, such as API, AP2, APK, etc. Each of the patterns of interest 270 may include one or more predetermined patterns. A pattern of interest that includes multiple patterns (e.g., API, APK) may also be referred to as a signature. API includes n patterns represented by DFA1 to DFAN. Upon a successful match of DFA1 of API for a given client application, DFA2 of API is started for that client application. Upon completing DFAN for API, a pattern of interest is identified. Unlike API, AP2 includes a single pattern presented by DFAn+1·APK includes multiple patterns represented by DFAk, DFAk+1, etc. Note that the multiple patterns of a pattern of interest may be represented by a tree structure, where each node of the tree structure corresponds to a pattern of the signature.

The TPS 230 may perform pattern matching on the packets 260 received. For example, consider the packet 261, which is destined to the client application 241. The TPS 230 performs pattern matching on the packet 261 to determine whether the packet 261 and the other packets received so far contain data matching the predetermined pattern corresponding to the DFAn 271. The TPS 230 may store a logical pointer 281 pointing at the DFAn 271 of Signature! after performing pattern matching on the packet 261. In addition, processing logic may store another pointer to point at the current state in the corresponding DFA, i.e., DFAn 271, as described above with reference to FIG. 2A. This state tracking may be bidirectional (i.e., states may be kept on traffic in both directions between client applications 241-244 and the network 250).

The techniques discussed above may be implemented in various embodiments of a networked system. One exemplary embodiment is discussed below to illustrate the concept. However, one should appreciate that the invention is not limited to the configurations in the following embodiment. For example, the TPS 230 may run on a dedicated machine or on different devices within the system, such as a router, a switch, a server, etc.

Figure 3:
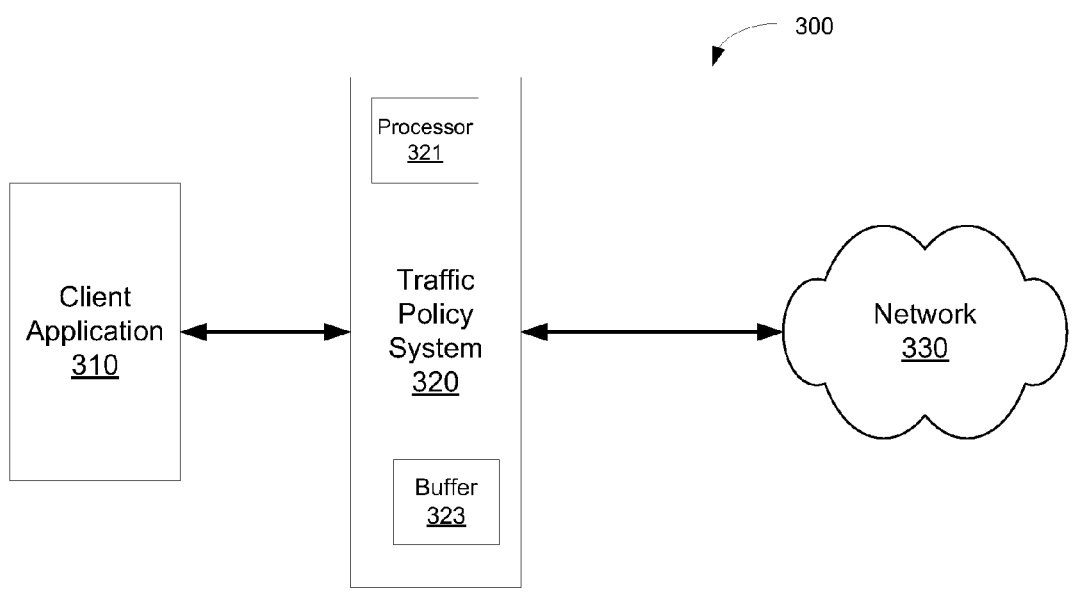
FIG. 3 illustrates a system to perform traffic policy management.

FIG. 3 illustrates one embodiment of a system usable with the invention. The system 300 includes at least one client application 310, a TPS 320, and a network 330. The client application 310 is communicably coupled to the TPS 320. The TPS 320 is communicably coupled to the network 330. Data is transmitted between the network 330 and the client application 310 via the TPS 320 in packets. In one embodiment, the TPS includes a processor 321 and a buffer 323.

Note that any or all of the components and the associated hardware illustrated in FIG. 3 may be used in various embodiments of the system 300. However, it should be appreciated that other configurations of the system 300 may include more or less devices than those shown in FIG. 3.

In some embodiments, the processor 321 of the TPS 320 determines whether a packet received is out of order. The processor 321 may examine a sequence number in the packet to determine whether the packet received is out of order. If the packet is out of order, the processor 321 may make a copy of the packet and temporarily store the copy in the buffer 323 before allowing the packet to pass through the TPS 320. If the packet is in order, the processor 321 may perform pattern matching on the packet to determine whether the packet and the other packets received so far contain one of a number of predetermined patterns. Some of these predetermined patterns may be part of a signature. In order to keep track of which pattern is being matched, the processor 321 may use a logical pointer to keep track of the pattern that is currently being matched.

In one embodiment, the processor 321 uses a corresponding DFA to perform pattern matching against one of the predetermined patterns. The DFA may include a number of states corresponding to different parts of the predetermined pattern. When the final state in the DFA is reached, the processor 321 knows that the packets received so far contains the predetermined pattern. The processor 321 may use a pointer to keep track of the current state of the DF A. In addition, the processor 321 may use another pointer to keep track of which one of the predetermined patterns the processor 321 is matching. Detail of one embodiment of the process to perform multiple packet payload analysis in the TPS 320 is described above with reference to FIGS. 1A and 1B.

Multi-Connection Traffic Policy Management

Figure 4:
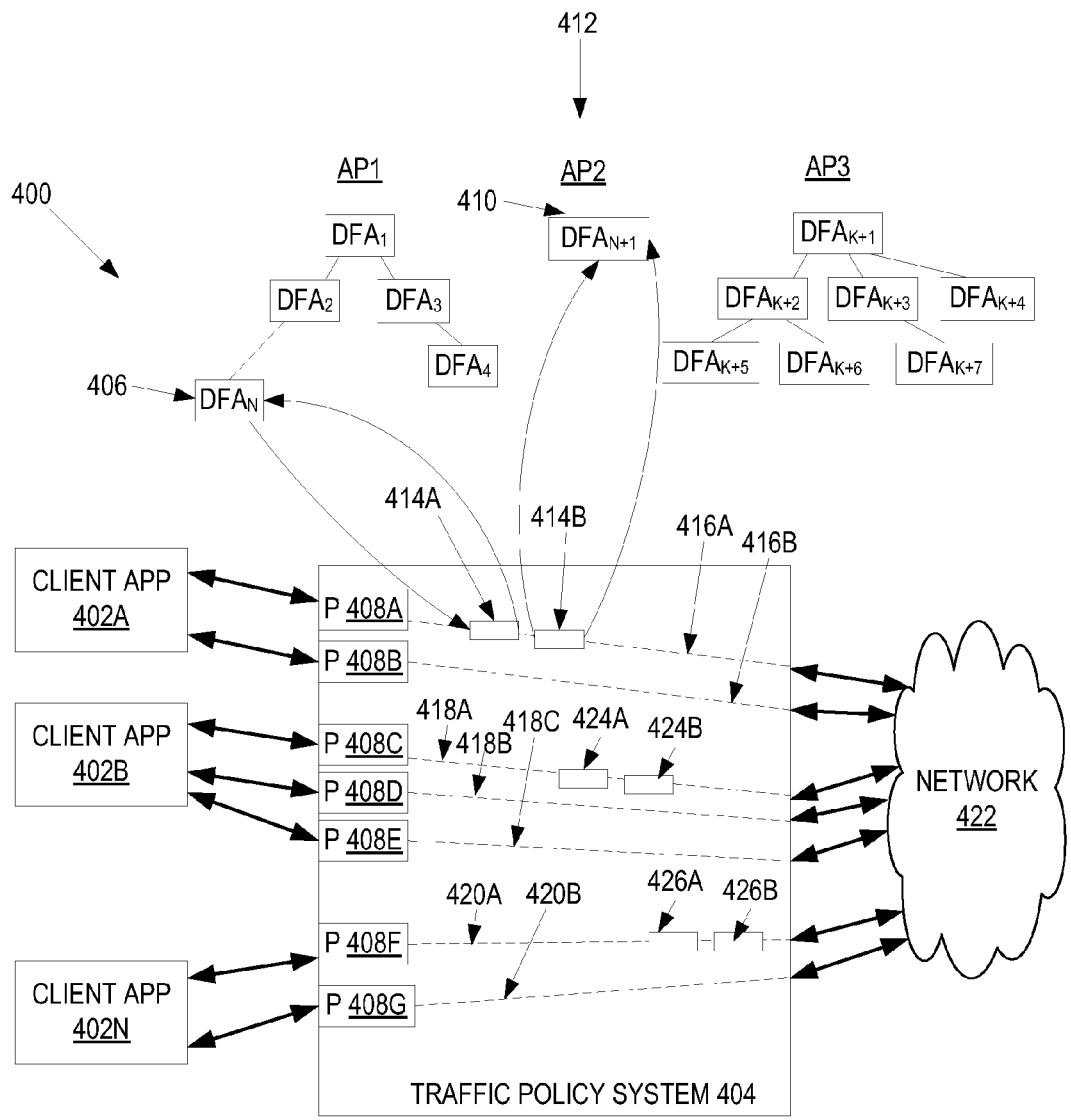
FIG. 4 illustrates a system to perform multi-connection traffic analysis and management.

As described above, a traffic policy system can identify a data flow based on a pattern of interest. Furthermore, the traffic policy system can identify a traffic policy of another data flow based on identifying a pattern of interest in initial data flow. FIG. 4 illustrates a system 400 to perform multi-connection traffic analysis and management usable with the invention. In one embodiment, the system 400 includes a network 422, a TPS 404, and a number of client applications 402A-N. The client applications 402A-N may run on different client machines (e.g., a personal computer, a workstation, server, other computing device, etc.) or two or more of the client applications 402A-N may run on a single client machine. Furthermore, the TPS 404 may run on one of the client machines or on a separate unit, such as a server, a router, or a switch.

In addition, each of client applications may have more than one connection that the corresponding client application is using. While in one embodiment, each connection can be a TCP connection, in alternate embodiments, the connection can be used for another type of data protocol (UDP, SIP, HTTP, HTTPS, FTP, etc.). In one embodiment, each connection for each client 402A-N is used to communication data using a data flow. For example and in one embodiment, client application 402A has connections for data flows 416A-B, client application 402B has connections for data flows 418A-C, and client application 402N has connections for data flows 420A-B. Data flows are groups of packets with similar characteristics. Examples of packet characteristics are, but not limited to, application source/destination, application data, data in the packet payload, application function, IP source, IP destination, IP source port, IP destination port, MPLS tag, VLAN tag, MAC source address, MAC destination address, DSCP bit, ATM virtual circuit information (VCI)/virtual path information (VPI), etc. or combinations thereof. Furthermore, TPS 404 include policy modules 408A-G that applies the corresponding traffic policy to each data flow 416A-B, 418A-C, and 420A-B, respectively, flowing through TPS 404.

In one embodiment, these connections can be used for communicating multiple different data flows and/or can be used to as one or more data flows for control data flow(s) with the rest of the data flows used for communicating data. In one embodiment, a control data is used to control the communication of data in the data flows between the corresponding client application 402A-N and the network 422.

In some embodiments, data packets 414A-B, 424A-B, and 426A-B (e.g., TCP, UDP, etc. packets) are transmitted via the TPS 404 between the network 422 and the client applications 402A-N. In order to detect multiple signatures in the packets passing through the TPS 404, the TPS 404 keeps track of which signature(s) is being matched for which connection and which pattern within the corresponding signature is being matched. Referring to FIG. 4, the TPS 404 is programmed to detect a number of patterns of interest 412, such as AP1, AP2, APK, etc. Each of the patterns of interest 412 may include one or more predetermined patterns. A pattern of interest that includes multiple patterns (e.g., AP1, APK) may also be referred to as a signature. AP1 includes n patterns represented by DFA1 to DFAN. Upon a successful match of DFA1 of AP1 for a given client application, DFA2 of AP1 is started for that client application. Upon completing DFAN for API, a pattern of interest is identified. Unlike API, AP2 includes a single pattern presented by DFAn+1·APK includes multiple patterns represented by DFAk, DFAk+1, etc. Note that the multiple patterns of a pattern of interest may be represented by a tree structure, where each node of the tree structure corresponds to a pattern of the signature.

The TPS 404 may perform pattern matching on the packets 414A-B received. For example, consider the packet 414A, which is destined to the client application 402A. The TPS 404 performs pattern matching on the packet 414A to determine whether the packet 414A and the other packets received so far contain data matching the predetermined pattern corresponding to the DFAn 412. The TPS 404 may store a logical pointer pointing at the DFAn 406 of Signature! after performing pattern matching on the packet 414A. In addition, processing logic may store another pointer to point at the current state in the corresponding DFA, i.e., DFAn 406, as described above with reference to FIG. 2A. This state tracking may be bidirectional (i.e., states may be kept on traffic in both directions between client applications 402A-N and the network 422).

The techniques discussed above may be implemented in various embodiments of a networked system. One exemplary embodiment is discussed below to illustrate the concept. However, one should appreciate that the invention is not limited to the configurations in the following embodiment. For example, the TPS 230 may run on a dedicated machine or on different devices within the system, such as a router, a switch, a server, etc.

Figure 5:
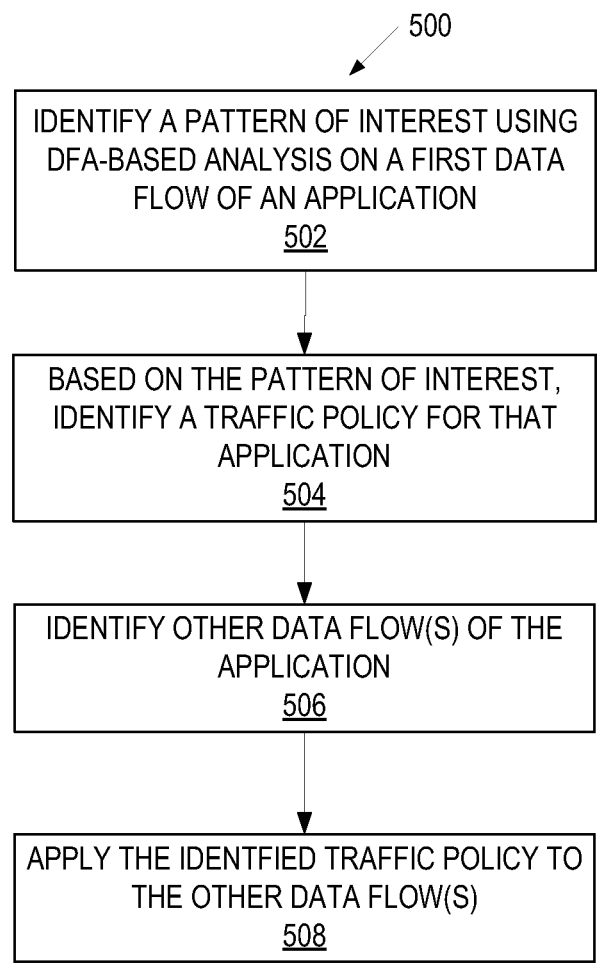
FIG. 5 illustrates a flow diagram of one embodiment of a process to perform multi-connection traffic analysis and management.

FIG. 5 illustrates a flow diagram of one embodiment of a process 500 to perform multi-connection traffic analysis and management. In one embodiment, the process 500 is performed by processing logic that may comprise hardware (e.g., circuitry, dedicated logic, etc.), software (such as is run on a general-purpose computer system, a server, a router, or a dedicated machine), or a combination of both. In FIG. 5, process 500 begins by identifying a pattern of interest using the DFA-based analysis on a first data flow of a client application. In one embodiment, process 500 identifies the pattern of interest using the DFA-based multi-packet analysis as described above in FIGS. 1A-B and 2A-C. In one embodiment, process 500 can identify patterns that are used to identify the type of data flow (e.g., the type of protocol (HTTP, HTTPS, RTP, Session Initiation Protocol (SIP), FTP, etc.). In another embodiment, process 500 identifies the type of data being used by the client application. In this embodiment, process 500 examines the packet payload of the data packets that are being communicated to determine the type of data. For example and in one embodiment, the data flow being examined can be an FTP control data flow. An FTP control data flow is a data flow that is used by an FTP application to communicate the FTP commands. In this embodiment, the pattern of interest could first identifying an FTP control data flow (e.g., identified by the use of port 21, identifying the use of FTP protocol commands, etc.) and then identifying a transfer of a particular data file (e.g., an MP3 file, .exe file, etc.). As an example, process 500 could detect the pattern "STOR*.mp3" to detect the uploading of an MP3 audio file or "RETR*.exe" to detect the downloading of a personal computer executable file.

In another embodiment, process 500 can identify a pattern of interest based on the based on the protocol used and the specific contents of the data payload. In one embodiment, process 500 identifies a pattern of interest based on the target server of the client application. For example and in one embodiment, process 500 identifies a pattern of interest for HTTP (or HTTPS) by identifying the website in the uniform resource locator (URL) used in a web request (e.g., "http://www.domain1.com").

For example and in one embodiment, a multimedia session between users can be identified using the SIP protocol. SIP is a control protocol used to initiate a multimedia session between two or more users (e.g., a Voice-over-IP call, video conferencing session, etc.). When SIP call is initiated (e.g., via INVITE message type), information about the call is exchanged between the several users that are about to engage in that call. Some or all of this information is encapsulated inside of Session Description Protocol (SDP) messages inside of SIP message body. In one embodiment, some of information that is exchanged are initiator and responder email identifiers, media stream format type, the IP addresses and port numbers of each point of contact, call identifier, as well as session start times and session duration. At block 504, process 500 identifies a traffic policy for that application based on the identified pattern of interest. Process 500 can identify the traffic policy of the data flows for the identified application. In one embodiment, process 500 can identify for one or more traffic policies for the client application data flows: drop the packets of the data flows; capture the packets; allow some of the client applications to proceed and disallow others; allow transfer of some type of files and disallow other types of file transfer; restrict the bandwidth of the dataflow; ensure a bandwidth for the data flow; apply some other QoS, time based policies, modify data/packet payload, send application-specific responses, etc. For example and in one embodiment, the traffic policy for an identified data flow(s) is to restrict the bandwidth to 1.0 MB/sec. In this embodiment, data flows less desirable websites can be throttled (sports, social networking, movies, etc.) and thus freeing up network resources for other services.

Furthermore, this identified policy can be applied to different data flows of the client application that was originally analyzed in block 502 above. In one embodiment, a client application can have a connection for a control data flow and a data flow for data transfer. For example and in one embodiment, a FTP client would use a control data flow to communicate control commands for the FTP protocol and a "data" data flow to transfer files. In this embodiment, process 500 could identify the traffic policy for the "data" data flow and leave the current traffic policy for the control data flow unidentified. As an example, process could identify a control data flow for the FTP client at block 502 above and apply a traffic policy to the "data" data flow. For example and in one embodiment, process 500 could restrict the bandwidth for the "data" data flow (e.g., restricting the "data" data flow to 1.0 MB/sec, etc.), ensure a minimum bandwidth for that data flow, etc. In this embodiment, process 500 affects the communication of the packets in the "data" data flow and not in the control data flow for the FTP session.

At block 506, process 500 identifies the other data flow(s) of the client application identified in block 502. In one embodiment, process 500 interrogates the data payload of the packets in the control data flow to determine the "data" data flow. For example and in one embodiment, process 500 could identify an FTP protocol command "PORT" that designates the port to be used for that "data" data flow of the FTP client. By knowing the port used for the "data" data flow, process 500 can identify the "data" data flow. For example and in one embodiment, process would identify packets with the port used in the PORT command and with an Internet protocol (IP) address associated with the FTP client application.

As described above, SIP is a control channel protocol and the information in the SIP control messages (e.g., an INVITE message) is used to set up the multimedia data channel of this session. In one embodiment, the multimedia channel is an R TP channel, and the information extracted from the SIP call is used to identify the RTP data channel. For example and in one embodiment, process 500 can use one or more of the initiator and responder email identifiers, media stream format type, the IP addresses and port numbers of each point of contact, call identifier, as well as session start times and session duration in the SIP control messages to identify the corresponding RTP channel.

In another example, process 500 identifies RTP data channels using the H.323 protocol. As is known in the art, H.323 is a protocol to provide audio/visual communication sessions on a packet network. The H.323 standard provides call signaling and control, multimedia transport and control, and bandwidth control for point-to-point and multi-point audio/visual conferences. In one embodiment, H.323 is used for call signaling and control and the audio-visual data is transported over an RTP data channel.

In one embodiment, process 500 inspects a H.323 control channel to determine the corresponding RTP data channel. In this embodiment, a caller connects to another caller via an H.323 Admission Request, Admission Confirm message sequence. As described above, H.323 protocol uses an RTP data channel to transport the audio/visual data for the audio/visual conference. The RTP multimedia session is negotiated using Open Logical Channel, Open Logical Channel ACK message sequences that is part of H.245 format. In this embodiment, process 500 inspects the Open Logic Channel message sequences, which contains the identifiers to associate the control H.323 protocol session with the RTP data channel.

At block 508, process 500 applies the identified traffic policy to the other data flow(s). In one embodiment, process 500 applies this identified traffic policy to the data packets of the other data flow(s). For example and in one embodiment, process 500 could restrict the bandwidth of the other data flow(s), drop the packets of those data flow(s), apply some sort of QoS to the data flow(s), etc.

Process 500 as described in FIG. 5 above can be used to apply traffic policies for various different scenarios. For example and in one embodiment, process 500 may be used to restrict/guarantee bandwidth for certain file types in a file transfer programs, block/throttle packets for peer-to-peer (P2P) programs, block emailing of sensitive files, identifying the payload of data packet, improving the throughput of a Post Office Protocol (POP), etc. Although certain examples of the invention are illustrated below, the invention is not so limited and other examples can be envisioned by one of skill in the art utilizing the invention.

In one embodiment, process 500 may be used to restrict/guarantee bandwidth for certain file types in a file transfer processes. For example and in one embodiment, process 500 can be used to restrict bandwidth for transfer of MP3 audio files. In this embodiment, process 500 would identify a file transfer control data flow (e.g., a control data flow of an FTP client, etc.). For example, process 500 could identify that an MP3 audio file is being transferred using an FTP client by identifying the pattern "STOR popsong.mp3" or "RETR popsong.mp3", where "popsong.mp3" is the MP3 audio file. Furthermore, process 500 could identify the "data" data flow by identifying the pattern "PORT 24972" in the control data flow. This could identify the "data" data flow as using IP port 24972 to transfer the file "popsong.mp3" for the IP address associated with the FTP client. Process 500 could apply a policy of restricting that data flow to 1.0 MB/sec. In one embodiment, process 500 applies this policy to the "data" data flow. Alternatively, process 500 could block the transfer of this file by dropping the packets in the "data" data flow of the FTP client.

For example and in one embodiment, a traffic policy can be to bandwidth manage all multimedia calls from joe@company.com. In this embodiment, process 500 inspects the control channel and applies action to the data channel. More specifically, process 500 identifies the initiator in the SIP messages of the control channel to determine if the multimedia call is from joe@company.com. By inspecting the SIP messages, the corresponding RTP data channel can be identified by process 500. This associates the RTP data channel of the multimedia session with the appropriate control session. Process 500 can apply bandwidth management action on the data channel session, while executing custom application level policy inspection of the control (SIP) session. For example and in one embodiment, process 500 applies a custom application level policy inspection of the SIP session by inspecting SIP messages for joe@company.com. In this embodiment, process 500 identifies the particular SIP control channel. Using the information in the SIP control channel, process 500 identifies the corresponding RTP channel for the multimedia call for joe@company.com. Process 500 can apply bandwidth management (e.g., limit RTP channel to 1.0 Mb/sec, guarantee a minimum 5.0 Mb/sec for the RTP channel, and/or any other type of bandwidth management as known in the art, etc.).

In another embodiment, process 500 can block/throttle packets used in P2P programs. For example and in one embodiment, process 500 can identify a P2P data flow that is hidden as HTTP traffic. In this embodiment, the P2P program tries to obfuscate the data packets for the P2P program by masquerading as a web traffic using the HTTP protocol and web IP ports. Process 500 can identify the pattern of the P2P program the packet payload of the data flow for the P2P program. This identification can trigger a change in traffic policies used for HTTP traffic flows from the device using the P2P program. Alternatively process 500 can analyze the traffic and invoke a different of traffic policies and apply them to the HTTP data flows.

In a further embodiment, process 500 can modify the data payload of data packets based on an identification of a pattern of interest. For example and in one embodiment, process 500 could identify a pattern of interest that indicates a virus. In this embodiment, the virus is identifies by an ".exe" file suffix. Process 500 may change the name of the file to have another file suffix, such as ".txt". By changing the file suffix, process 500 may disable the virus, as the virus would not be executed on a target device until the file suffix is changed back to ".exe".

In another embodiment, process 500 may identify a sensitive file being transferred (e.g., attached as an email, using a file transfer client, web upload/download, etc.). In this embodiment, process 500 can identify a sensitive file (e.g. "hr-policies-2010.doc", etc.) in a web email client in one data flow and block the corresponding upload in another data flow that contains this sensitive file.

In one embodiment, process 500 may modify the data packet payload by attaching a file to satisfy a policy, such as adding a legal disclaimer in response to identifying a sensitive file. In this embodiment, process may add a reference to a legal disclaimer to one or more of the data packet payloads. Alternatively, process 500 my inject one or more data packets into the data flow to hold the legal disclaimer.

In yet another embodiment, process 500 may improve the throughput of a POP email client. In this embodiment, process 500 may detect that an email is bad or otherwise malformed (e.g., the email does not conform to the Multipurpose Internet Mail Extensions (MIME) standard, etc.). Because a POP client operates as a simple queue, if the client does not fully download the bad email, the POP client cannot advance to the next email. In this embodiment, process 500 could identify the bad email using pattern analysis and complete the download of the bad email. By doing this, process 500 has satisfied the download of the bad email for the POP server and the POP client can resume the downloading of the rest of the emails in the POP queue for that POP client.

In another embodiment, process 500 can identify a data flow corresponding to one client application and apply a traffic policy to another data flow for another client application.

Figure 6:
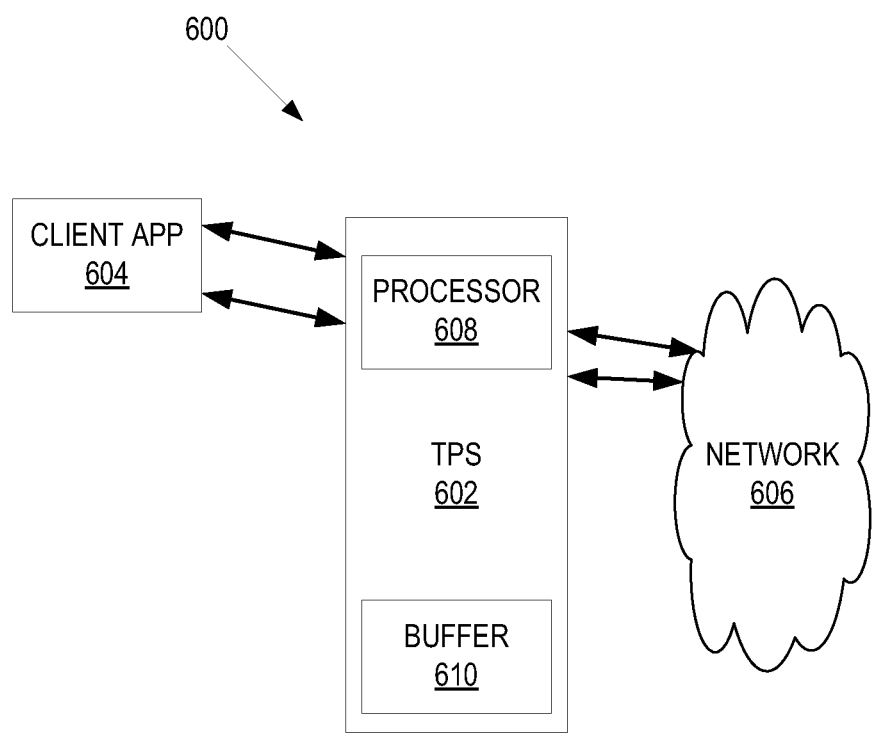
FIG. 6 illustrates a network element to perform multi-connection traffic analysis and management.

FIG. 6 illustrates a system 600 to perform multi-connection traffic analysis and management. The system 600 includes at least one client application 604 that uses multiple connections, a TPS 602, and a network 606. The client application 604 is communicably coupled to the TPS 602. The TPS 602 is communicably coupled to the network 606. Data is transmitted between the network 606 and the client application 604 via the TPS 602 in packets. In one embodiment, the TPS includes a processor 608 and a buffer 610.

Note that any or all of the components and the associated hardware illustrated in FIG. 6 may be used in various embodiments of the system 600. However, it should be appreciated that other configurations of the system 600 may include more or less devices than those shown in FIG. 6.

In some embodiments, the processor 608 of the TPS 602 determines whether a packet received is out of order. The processor 608 may examine a sequence number in the packet to determine whether the packet received is out of order. If the packet is out of order, the processor 608 may make a copy of the packet and temporarily store the copy in the buffer 610 before allowing the packet to pass through the TPS 602. If the packet is in order, the processor 608 may perform pattern matching on the packet to determine whether the packet and the other packets received so far contain one of a number of predetermined patterns. Some of these predetermined patterns may be part of a signature. In order to keep track of which pattern is being matched, the processor 608 may use a logical pointer to keep track of the pattern that is currently being matched.

In one embodiment, the processor 608 uses a corresponding DFA to perform pattern matching against one of the predetermined patterns. The DFA may include a number of states corresponding to different parts of the predetermined pattern. When the final state in the DFA is reached, the processor 608 knows that the packets received so far contains the predetermined pattern. The processor 608 may use a pointer to keep track of the current state of the DFA. In addition, the processor 608 may use another pointer to keep track of which one of the predetermined patterns the processor 608 is matching. Detail of one embodiment of the process to perform multiple packet payload analysis in the TPS 602 is described above with reference to FIGS. 1A and 1B. Furthermore, TPS 602 may perform multi-connection traffic analysis and management as described in FIG. 5 above.

Figure 7A:
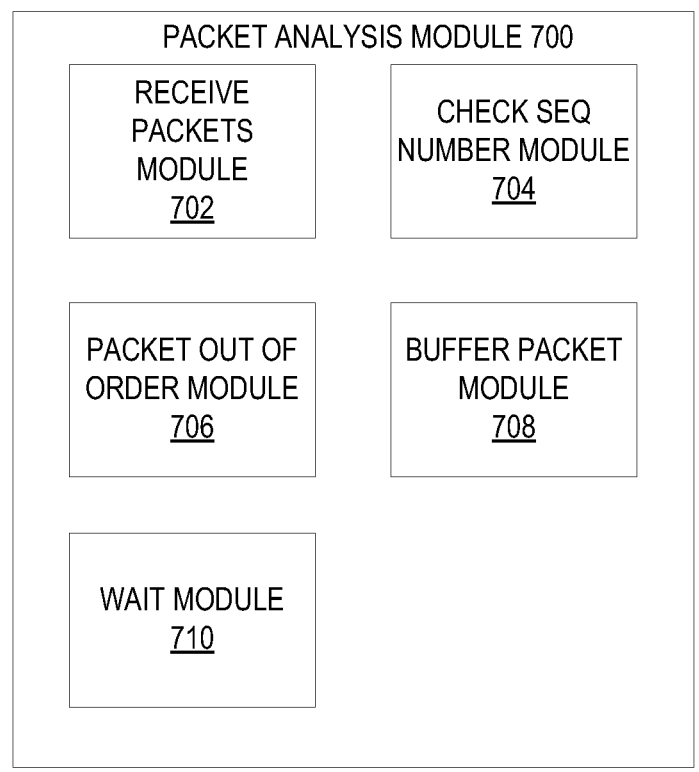
FIG. 7A is a block diagram of embodiment of a packet analysis module to perform multi-packet payload analysis.

FIG. 7A is a block diagram of embodiment of a packet analysis module 700 to perform multi-packet payload analysis. In one embodiment, the packet analysis module 700 is performs multi-packet payload analysis in a TPS 602 using the process as outlined in the FIG. 1A above. In one embodiment, packet analysis module 700 includes receive packets module 702, check number sequence module 704, packet out of order module 706, buffer packet module 708, and wait module 710. The receive packets module 702 receives packet(s) as described in FIG. 1A, block 110 above. The check number sequence module 704 checks the sequence number of the received packet(s) as described in FIG. 1A, block 115 above. The packet out of order module 706 determines is the received packet(s) are out of order as described in FIG. 1A, block 120 above. The buffer packet module 708 buffers the received packet(s) as described in FIG. 1A, block 125 above. The wait module 710 waits for the next packet to arrive as described in FIG. 1A, block 129 above.

Figure 7B:
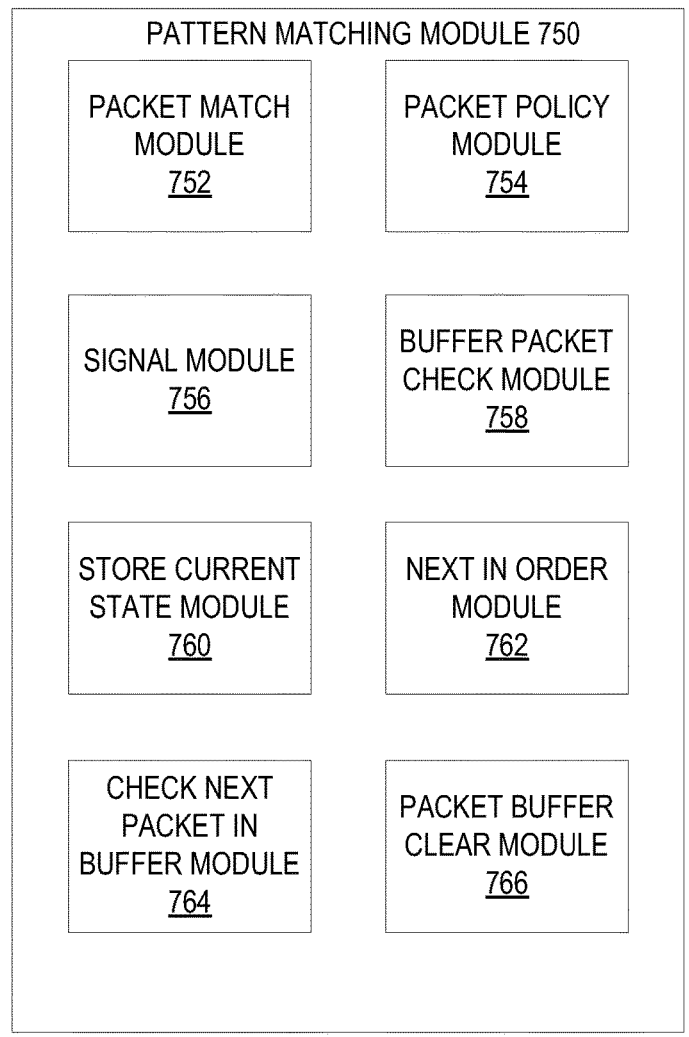
FIG. 7B is a block diagram of one embodiment of a pattern matching module to perform payload pattern matching.

FIG. 7B is a block diagram of one embodiment of a pattern matching module 750 to perform payload pattern matching. In one embodiment, the pattern matching module 750 performs payload pattern matching in a TPS 602 using the process as outlined in the FIG. 1B above. In one embodiment, pattern matching module 750 includes packet match module 752, packet match policy module 754, signal module 756, buffer packet check module 758, store current state module 760, next in order module 762, check next packet in buffer module 764, and packet buffer clear module 766. The packet match module 754 performs pattern matching as described in FIG. 1B, block 135 above. The packet policy module 754 identifies the data flow as having a pattern of interest as described above in FIG. 1B, block 137. The signal module 756 signals a match as described in FIG. 1B, block 139 above. The buffer packet check module 758 checks if there are buffered packets as described in FIG. 1B, block 140 above. The store current state module 760 updates and stores the current state as described in FIG. 1B, block 152 above. The next in order module 762 checks whether the buffered packet is next in order as described in FIG. 1B, block 142 above. The check next packet in buffer module 764 checks whether there is another buffered packet as described in FIG. 1B, block 150 above. The packet buffer clear module 766 clears the buffer as described in FIG. 1B, block 148 above.

Figure 8:
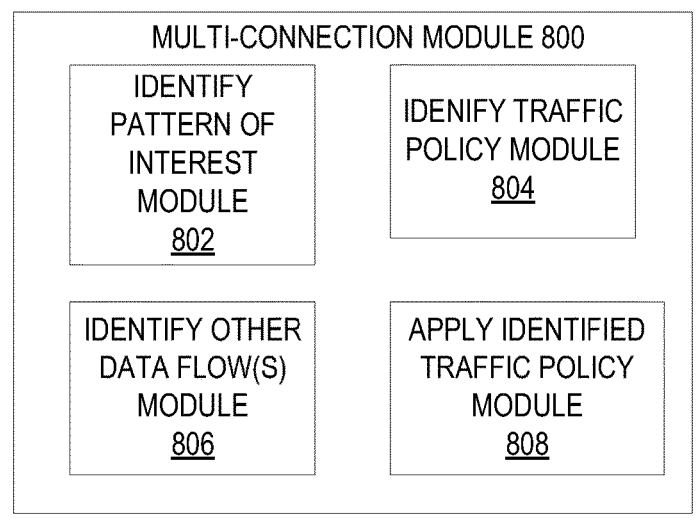
FIG. 8 is a block diagram of one embodiment of a multi-connection module to perform multi-connection traffic analysis and management.

FIG. 8 is a block diagram of one embodiment of a multi-connection module 800 to perform multi-connection traffic analysis and management. In one embodiment, the multi-connection module 800 performs multi-connection traffic analysis and management in a TPS 602 using the process 500 as described in the FIG. 5 above. In one embodiment, the multi-connection module 800 includes identify pattern of interest module 802, identify traffic policy module 804, identify other data flow(s) module 806, and apply identified traffic policy module 808. The identify pattern of interest module 802 identifies a pattern of interest in a data flow of a client application as described in FIG. 5, block 502. The identify traffic policy module 804 identifies the traffic policy as described in FIG. 5, block 504. The identify other data flow(s) module 806 identifies other data flow(s) of the client application as described in FIG. 5, block 506. The apply identified traffic policy module 808 applies the identified traffic policy to the other data flow(s) as described in FIG. 5, block 508.

Exemplary Network Configurations

Figure 9:
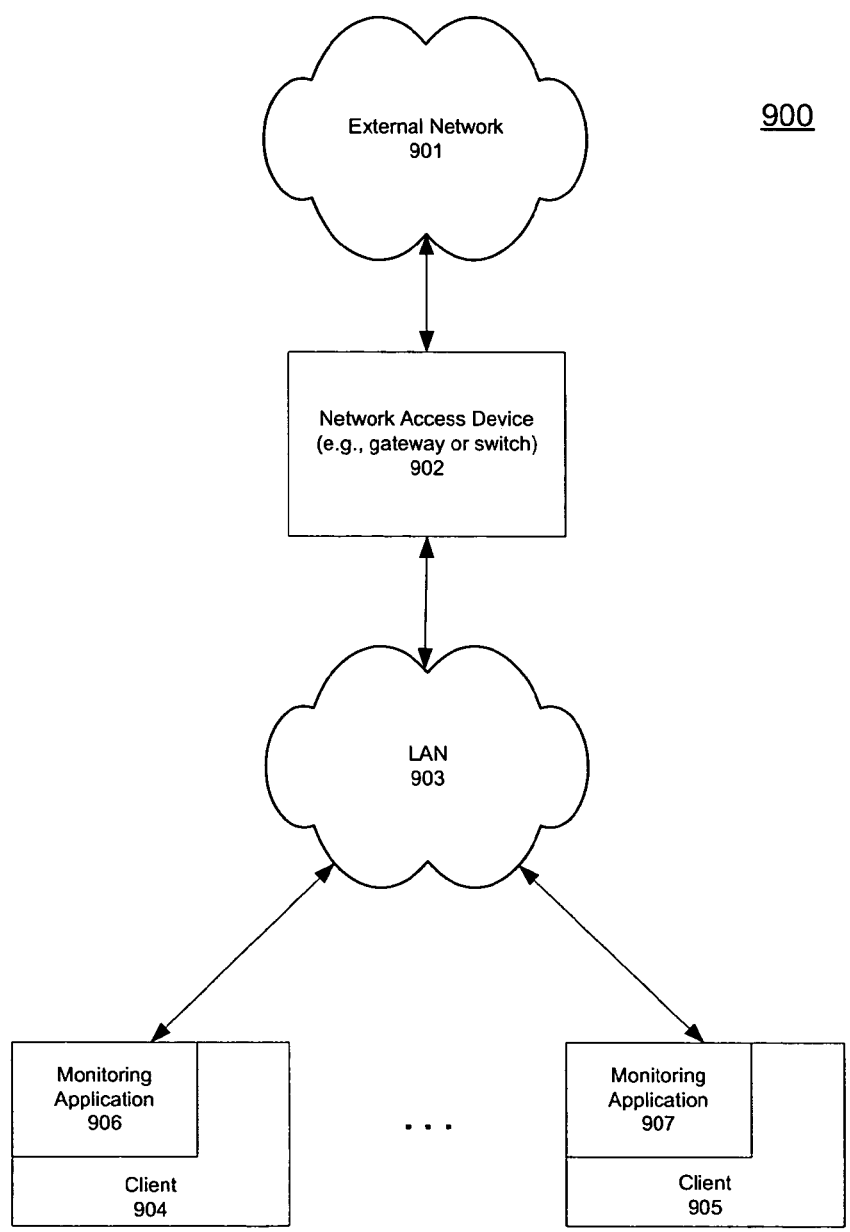
FIG. 9 is a block diagram illustrating an exemplary network configuration according to one embodiment.

FIG. 9 is a block diagram illustrating an exemplary network configuration according to one embodiment. Referring to FIG. 9, in one embodiment, the exemplary configuration 900 includes a network access device 902 providing network access services for one or more clients 904-905 over a local area network 903. In order to access a remote facility over an external network 901, each of the clients 904-905 has to go through the network access device 902 and optionally, a network service provider (e.g., an Internet service provider).

In one embodiment, the connection between the network access device 902 and the external network 901 may be a wired connection. Alternatively, such a connection may be a wireless connection; for example, a satellite or an IEEE 802.16 connection. The external network 901 may be a wide area network (WAN), such as, for example, the Internet. The LAN 903 may be a home network using an IEEE 802.1x compatible protocol. Alternatively, the LAN 903 may be a local network within an organization (e.g., an Intranet). The LAN 903 may be a wired or wireless network, or a combination of both, using a variety of network protocols, such as, Ethernet and/or IEEE 802.xx compatible protocols, such as, for example, Wi-Fi and/or Bluetooth protocols. Wireless connections may include both RF and non-RF links, for example, an IR link. Wired connections may include both electrical and non-electrical links, for example, fiber optic links.

According to one embodiment, each of the clients 904-905, also referred to as protected hosts, may include a monitoring application 906-907 respectively. The monitoring application of a protected host periodically or constantly communicates with the network access device 902 over the LAN 903. When the network access device 902 receives a packet of a data flow containing multiple packets, the network access device 902 may decode, decompress, and/or perform data pattern matching on a packet-perpacket basis without having to wait for the rest of the packets to arrive, using at least one of the techniques described above. Furthermore, network access device 902 may perform multi-connection analysis and management using at least one of the techniques described above.

When a predetermined data pattern is found in one or more data packets of the data flow, the network access device may block the data packets as well as the remaining data packets that are about to arrive. Thereafter, according to one embodiment, the network access device 902 may notify the corresponding protected host that is receiving the data flow that a predetermined data pattern has been found in the data flow. The notification is received by the corresponding monitoring application (e.g., monitoring applications 906-907) of the protected host. The protected host may discard the packets that have already been received in response to the notification. Alternatively, the monitoring application of the protected host may periodically pull the network access device 902 to query the status of the data flow. Other configurations may exist.

Figure 10:
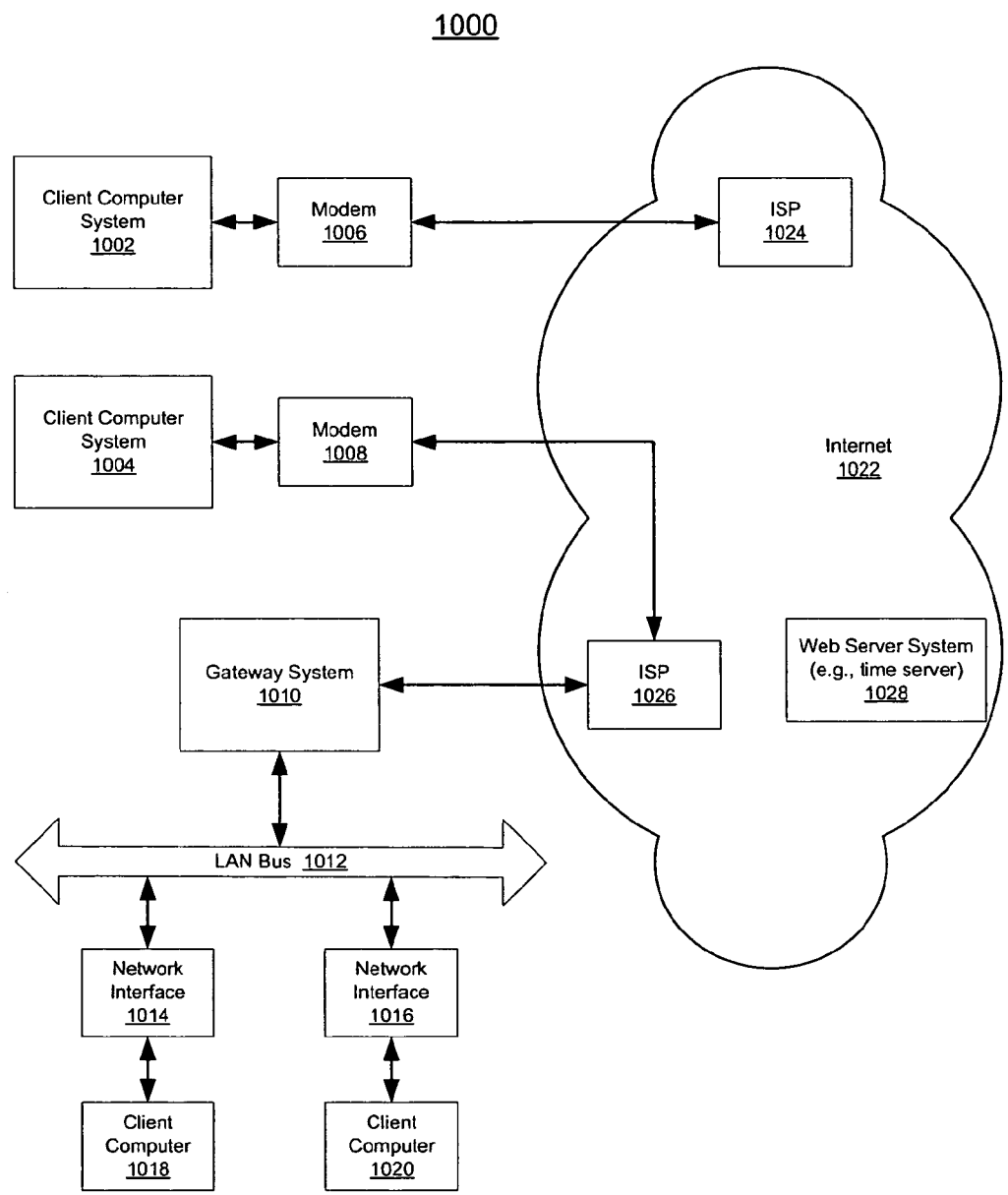
FIG. 10 is a diagram of a network of computer systems, which may be used with an embodiment of the invention.

FIG. 10 is a diagram of a network of computer systems, which may be used with an embodiment of the invention. As shown in FIG. 10, a network 1000 includes a number of client computer systems that are coupled together through an Internet 1022. It will be appreciated that the term "Internet" refers to a network of networks. Such networks may use a variety of protocols for exchange of information, such as TCP/IP, ATM, SNA, SDI, and/or other protocols known in the art. The physical connections of the Internet and the protocols and communication procedures of the Internet are well known to those in the art. It will be also appreciated that such systems may be implemented in an Intranet within an organization.

Access to the Internet 1022 is typically provided by Internet service providers (ISPs), such as the ISP 1024, and the ISP 1026. Users on client systems, such as the client computer systems 1002, 1004, 1018, and 1020, generally obtain access to the Internet through Internet service providers, such as ISPs 1024 and 1026. Access to the Internet may facilitate transfer of information (e.g., email, text files, media files, etc.) between two or more digital processing systems, such as the client computer systems 1002, 1004, 1018, and 1020 and/or a Web server system 1028.

For example, one or more of the client computer systems 1002, 1004, 1018, and 1020 and/or the Web server 1028 may provide document presentations (e.g., a Web page) to another one or more of the client computer systems 1002, 1004, 1018, and 1020 and/or Web server 1028. For example, in one embodiment of the invention, one or more client computer systems 1002, 1004, 1018, and 1020 may request to access a document that may be stored at a remote location, such as the Web server 1028. In the case of remote storage, the data may be transferred as a file (e.g., download) and then displayed (e.g., in a window of a browser) after transferring the file. In another embodiment, the document presentation may be stored locally at the client computer systems 1002, 1004, 1018, and/or 1020. In the case of local storage, the client system may retrieve and display the document via an application, such as a word processing application, without requiring a network connection.

The Web server 1028 typically includes at least one computer system to operate with one or more data communication protocols, such as the protocols of the World Wide Web and, as such, is typically coupled to the Internet 1022. Optionally, the Web server 1028 may be part of an ISP, which may provide access to the Internet and/or other network(s) for client computer systems. The client computer systems 1002, 1004, 1018, and 1020 may each, with appropriate Web browsing software, access data, such as HTML document (e.g., Web pages), which may be provided by the Web server 1028.

The ISP 1024 provides Internet connectivity to the client computer system 1002 via a modem interface 1006, which may be considered as part of the client computer system 1002. The client computer systems 1002, 1004, 1018, and 1020 may be a conventional data processing system, such as a Power Mac G5 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 1026 provides Internet connectivity for the client computer systems 1002, 1004, 1018, and 1020. However, as depicted in FIG. 10, such connectivity may vary between various client computer systems, such as the client computer systems 1002, 1004, 1018, and 1020. For example, as shown in FIG. 10, the client computer system 1004 is coupled to the ISP 1026 through a modem interface 1008, while the client computer systems 1018 and 1020 are part of a local area network (LAN). The interfaces 1006 and 1008, shown as modems 1006 and 1008, respectively, may represent an analog modem, an ISDN modem, a DSL modem, a cable modem, a wireless interface, or other interface for coupling a digital processing system, such as a client computer system, to another digital processing system.

The client computer systems 1018 and 1020 are coupled to a LAN bus 1012 through network interfaces 1014 and 1016, respectively. The network interface 1014 and 1016 may be an Ethernet-type, asynchronous transfer mode (ATM), or other type of network interface. The LAN bus is also coupled to a gateway digital processing system 1010, which may provide firewall and other Internet-related services for a LAN. The gateway digital processing system 1010, in turn, is coupled to the ISP 1026 to provide Internet connectivity to the client computer systems 1018 and 1020. The gateway digital processing system 1010 may, for example, include a conventional server computer system. Similarly, the Web server 1028 may, for example, include a conventional server computer system.

In one embodiment, the local area network 1012 may be local wireless network (e.g., a home network) and the gateway 1010 may include a wireless access point (also referred to as a base station) to one or more clients 1018 and 1020 using a variety of wireless networking protocols; for example, the IEEE 1002.xx protocols including Wi-Fi and/or Bluetooth protocols. In a further embodiment, the gateway 1010 may access the server 1028 via dialup network services using a modem.

According to one embodiment, the data pattern matching techniques, decoding, and decompression techniques described above may be implemented with any of the network access devices, such as, modems 1006 and 1008, and/or gateway 1010.

Exemplary Data Processing System

Figure 11:
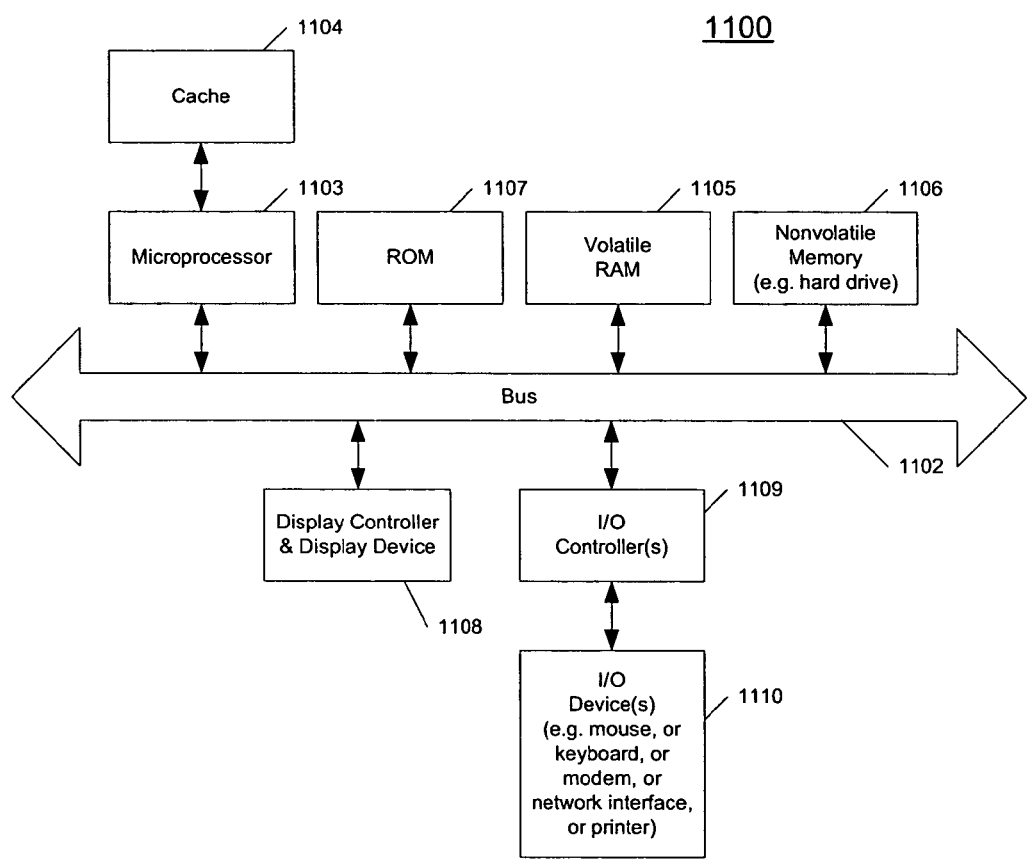
FIG. 11 is a block diagram of a digital processing system, which may be used with one embodiment of the invention.

FIG. 11 is a block diagram of a digital processing system, which may be used with one embodiment of the invention. For example, the system 1100 shown in FIG. 11 may be used as a client computer system such as a protected host. Alternatively, the exemplary system 1100 may be implemented as a network access device described above and/or a wireless access point.

Note, that while FIG. 11 illustrates various components of a computer system, it is not intended to represent any particular architecture or manner of interconnecting the components, as such details are not germane to the present invention. It will also be appreciated that network computers, handheld computers, cell phones, and other data processing systems, which have fewer components or perhaps more components, may also be used with the present invention. The computer system of FIG. 11 may, for example, be an Apple Macintosh computer or an IBM compatible PC.

As shown in FIG. 11, the computer system 1100, which is a form of a data processing system, includes a bus 1102, which is coupled, to a microprocessor 1103 and a ROM 11011, a volatile RAM 1105, and a non-volatile memory 1106. The microprocessor 1103, which may be, for example, a PowerPC G4 or PowerPC G5 microprocessor from Motorola, Inc. or IBM, is coupled to cache memory 1104 as shown in the example of FIG. 11. The bus 1102 interconnects these various components together and also interconnects these components 1103, 11011, 1105, and 1106 to a display controller and display device 1108, as well as to input/output (110) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM), which requires power continuously in order to refresh or maintain the data in the memory. The non-volatile memory 1106 is typically a magnetic hard drive, a magnetic optical drive, an optical drive, or a DVD RAM or other type of memory system, which maintains data even after power, is removed from the system. Typically, the non-volatile memory will also be a random access memory, although this is not required.

While FIG. 11 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1102 may include one or more buses connected to each other through various bridges, controllers, and/or adapters, as is well known in the art. In one embodiment, the 110 controller 1109 includes a USB (Universal Serial Bus) adapter for controlling USB peripherals. Alternatively, 110 controller 1109 may include an IEEE-1394 adapter, also known as Fire Wire adapter, for controlling Fire Wire devices. Other components may also be included.

Thus, a method and apparatus for identifying data patterns of a file have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "analyzing" or "computing" or "identifying" or "applying" or "storing" or "passing" or "looking" or "blocking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes storage medium (e.g., read only memory ("ROM"); random access memory ("RAM"); magnetic disk storage media; optical storage media; flash memory devices, etc.) and communication medium (electrical, optical, acoustical or other form of propagated signals (e.g., carrier waves, infrared signals, digital signals, etc.); etc.).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for inspecting data packets transmitted between computing devices, the method comprising:
    maintaining a first set of state information relating to a first set of data packets being transferred from a first application program at a first computing device to a second computing device, wherein the first set of data packets are associated with a first connection of a plurality of connections;
    maintaining a second set of state information relating to a second set of data packets being transferred from the second computing device to the first application program, wherein the second set of data packets are associated with the first connection of the plurality of connections;
    maintaining one or more additional sets of state information relating to data packets that are associated with at least a second connection of the plurality of connections;
    receiving a subsequent data packet associated with the first set of data packets, wherein the subsequent data packet is received out-of-order;
    buffering the subsequent data packet based on an identification that the subsequent data packet has been received out-of-order;
    receiving a data packet that precedes the buffered data packet associated with the first set of data packets;

updating the first set of state information based on a scan of the preceding data packet;
identifying that the updated first set of state information corresponds to a pattern of interest; and
initiating an action associated with the identified pattern of interest.

2. The method of claim 1, wherein the action associated with the identified pattern of interest corresponds to throttling bandwidth associated with the first connection.

3. The method of claim 1, wherein the action associated with the identified pattern of interest corresponds to preventing data associated with the first application program from being transferred between the first application program and the second computing device.

4. The method of claim 2, wherein throttling the bandwidth associated with the first connection ensures a minimum bandwidth for a data flow associated with the first connection in at least a first direction.

5. The method of claim 1, wherein the action associated with the identified pattern of interest corresponds to controlling an amount of bandwidth associated with an audio/visual conference.

6. The method of claim 1, wherein the action associated with the identified pattern of interest corresponds to controlling an amount of bandwidth associated with data transferred via a port associated with digital media transport.

7. The method of claim 1, wherein the one or more additional sets of state information include monitoring data regarding a first data flow in a first direction and a second data flow in a second direction.

8. A non-transitory computer-readable storage medium having embodied thereon a program executable by a processor for implementing a method for inspecting data packets transmitted between computing devices, the method comprising:
maintaining a first set of state information relating to a first set of data packets being transferred from a first application program at a first computing device to a second computing device, wherein the first set of data packets are associated with a first connection of a plurality of connections;
maintaining a second set of state information relating to a second set of data packets being transferred from the second computing device to the first application program, wherein the second set of data packets are associated with the first connection of the plurality of connections;
maintaining one or more additional sets of state information relating to data packets that are associated with at least a second connection of the plurality of connections;
receiving a subsequent data packet associated with the first set of data packets, wherein the subsequent data packet is received out-of-order;
buffering the subsequent data packet based on an identification that the subsequent data packet has been received out-of-order;
receiving a data packet that precedes the buffered data packet associated with the first set of data packets;
updating the first set of state information based on a scan of the preceding data packet;
identifying that the updated first set of state information corresponds to a pattern of interest; and
initiating an action associated with the identified pattern of interest.

9. The non-transitory computer-readable storage medium of claim 8, wherein the action associated with the identified pattern of interest corresponds to throttling bandwidth associated with the first connection.

10. The non-transitory computer-readable storage medium of claim 8, wherein the action associated with the identified pattern of interest corresponds to preventing data associated with the first application program from being transferred between the first application program and the second computing device.

11. The non-transitory computer-readable storage medium of claim 9, wherein throttling the bandwidth associated with the first connection ensures a minimum bandwidth for a data flow associated with the first connection in at least a first direction.

12. The non-transitory computer-readable storage medium of claim 8, wherein the action associated with the identified pattern of interest corresponds to controlling an amount of bandwidth associated with an audio/visual conference.

13. The non-transitory computer-readable storage medium of claim 8, wherein the action associated with the identified pattern of interest corresponds to controlling an amount of bandwidth associated with data transferred via a port associated with digital media transport.

14. The non-transitory computer-readable storage medium of claim 8, wherein the one or more additional sets of state information include monitoring data regarding a first data flow in a first direction and a second data flow in a second direction.

15. An apparatus for inspecting data packets transmitted between computing devices, the apparatus comprising:
a plurality of network interfaces that receive data packets associated with a plurality of different connections;
a memory that:
maintains a first set of state information relating to a first set of data packets being transferred from a first application program at a first computing device to a second computing device, wherein the first set of data packets are associated with a first connection of a plurality of connections,
maintains a second set of state information relating to a second set of data packets being transferred from the second computing device to the first application program, wherein the second set of data packets are associated with the first connection of the plurality of connections, and
maintains one or more additional sets of state information relating to data packets that are associated with at least a second connection of the plurality of connections; and
a processor that executes instructions out of the memory, wherein execution of the instructions by the processor:
buffers a subsequent data packet associated with the first set of data packets based on an identification that the subsequent data packet has been received out-of-order,
updates the first set of state information based on a scan of a received data packet that precedes the buffered data packet associated with the first set of data packets,
identifies that the updated first set of state information corresponds to a pattern of interest; and
initiates an action associated with the identified pattern of interest.

16. The apparatus of claim 15, wherein the action associated with the identified pattern of interest corresponds to throttling bandwidth associated with the first connection.

17. The apparatus of claim 15, wherein the action associated with the identified pattern of interest corresponds to preventing data associated with the first application program from being transferred between the first application program and the second computing device.

18. The apparatus of claim 16, wherein throttling the bandwidth associated with the first connection ensures a minimum bandwidth for a data flow associated with the first connection in at least a first direction.

19. The apparatus of claim 15, wherein the action associated with the identified pattern of interest corresponds to controlling an amount of bandwidth associated with an audio/visual conference.

20. The apparatus of claim 15, wherein the action associated with the identified pattern of interest corresponds to controlling an amount of bandwidth associated with data transferred via a port associated with digital media transport.

* * * * *